United States Patent
Rigosi et al.

(12)
(10) Patent No.: US 6,893,590 B1
(45) Date of Patent: May 17, 2005

(54) COUPLING METAL PARTS WITH A PLASTIC MATERIAL

(75) Inventors: Gian Luigi Rigosi, Ferrara (IT); Paolo Goberti, Vigarano Mainarda (IT)

(73) Assignee: Basell Polioefine Italia S.p.A., Milan (IT)

( * ) Notice: Subject to any disclaimer, the term of this patent is extended or adjusted under 35 U.S.C. 154(b) by 0 days.

(21) Appl. No.: 09/700,886

(22) PCT Filed: Mar. 13, 2000

(86) PCT No.: PCT/EP00/02196

§ 371 (c)(1),
(2), (4) Date: Nov. 21, 2000

(87) PCT Pub. No.: WO00/59990

PCT Pub. Date: Oct. 12, 2000

(30) Foreign Application Priority Data

Apr. 2, 1999 (EP) .............................. 99201014

(51) Int. Cl.$^7$ ............................................ B29C 45/14
(52) U.S. Cl. .................... 264/135; 264/264; 264/271.1; 264/275; 264/279
(58) Field of Search ................................ 264/275, 135, 264/265, 271.1, 279

(56) References Cited

U.S. PATENT DOCUMENTS 4,719,065 A * 1/1988 Gibbon ....................... 264/135
6,207,089 B1 * 3/2001 Chuang ...................... 264/135

FOREIGN PATENT DOCUMENTS

| | | | |
|---|---|---|---|
| DE | 4109397 | 9/1992 | |
| EP | 0400333 | 12/1990 | ......... C08F/297/08 |
| EP | 0472946 | 3/1992 | ......... C08F/297/08 |
| EP | 0483523 | 5/1992 | ........... C08L/23/14 |
| JP | 2041219 | 2/1990 | |
| JP | 6182808 | 7/1994 | |
| RU | 2001782 | 10/1993 | |
| SU | 1178994 | 8/1967 | |
| SU | 1192577 | 10/1967 | |
| WO | 9614533 | 5/1996 | .......... F16L/13/007 |

* cited by examiner

Primary Examiner—Edmund H. Lee

(57) ABSTRACT

A process for effecting a coupling between a plastic material and a metal surface comprising the steps of applying a powder of an adhesive polymer composition to the metal surface; then overmoulding the metal surface with a plastic material by injection moulding; and finally applying heat to the metal surface.

8 Claims, No Drawings

COUPLING METAL PARTS WITH A PLASTIC MATERIAL

This application is the U.S. national phase of International Application PCT/EP00/02196, filed Mar. 13, 2000.

The present invention relates to a process for coupling the surface of metal pans with plastic materials. In particular, it relates to a process for coating metal parts with plastic materials by injection moulding and to articles obtainable from the said process.

BACKGROUND OF THE INVENTION

Numerous articles employed in a lot of fields present a coupling between a plastic material and the surface of a metal part. The process of the present invention is suitable for preparing the said articles. The reasons for making the said coupling are various. For example, the coating of metal parts is sometimes necessary to prevent the metal surface from coming in contact with foods or being exposed to chemical substances during use. Examples of the articles obtainable from the process of the present invention are, therefore, closures. Bottle closures of a plastic material are joined to a metallic material, aluminium for example, in order to prevent the oxygen diffusion in bottles.

In industry it is also necessary to connect different parts, such as metal valves, metal fittings or metal pipes with pipes or fittings of a plastic material.

Methods for joining metal surfaces to plastic materials are already known. In particular a method for coupling a metal part with plastic materials by a injection moulding process is known. International patent application WO 96/14533 describes such a process. According to the described invention, the method involves the steps of applying an organic or inorganic primer to the metallic pipe or pipe fitting, then applying heat to the metallic pipe end or fitting and, subsequently, hot dipping the metallic pipe or pipe fitting into a fluidised bed of plastic material. The subsequent and last step is that of overmoulding the metallic pipe or pipe fitting with a plastic material by an injection moulding process.

The problem with the method disclosed in said patent application is that the adhesion strength between the metallic pipe and the plastic material is not high.

It has now been found a process that improves the adhesion strength between the metallic surface and the plastic material.

In addition, thanks to the process of the present invention a higher adhesion strength is obtained without damaging the coating of plastic material. In fact the chemical degradation of the polymer does not occur or is reduced to the minimum.

Moreover, the present process does not even cause the loss of the shape of the overmoulded plastic material due to the action of heat.

DETAILED DESCRIPTION OF THE INVENTION

Accordingly, the present invention provides a process for effecting a coupling between a plastic material and the surface of a metal part (metal surface) comprising the steps of:

a) applying an adhesive polymer composition on the metal surface;

b) overmoulding the metal surface with a plastic material by injection moulding; and c) applying heat to the metal surface.

The said metal surface can be the overall surface of the metal part of a portion of it, depending upon the kind of coupled article to be produced.

The part to be coupled with a plastic material can be of any type of metal or metal alloy. Examples of suitable metals and metal alloys are iron, aluminium, copper, steel and brass.

The part to be subjected to the process of the present invention may optionally be plated or treated with surface treatments generally employed in the art. Hence, a chromium or zinc plated part is suitable as well, for instance.

The adhesive polymer composition used in step (a) is preferably compatible with the polymer used for overmoulding the metal surface in step (b). The adhesive polymer could be the same polymer as the polymer used for the overmoulding, for example.

The adhesive polymer composition preferably comprises a polymer modified by grafting it with modifying agents containing functional groups. All the said adhesive polymer compositions available in the art are suitable. The modification of the polymer is obtained according to known processes, by mixing the polymer and modifying agent (such as maleic anhydride or isophorone bismaleamic acid or acrylic acid) either in the molten state or in solution, preferably in the presence of radical initiators such as organic peroxides. It is obtained a partial or total grafting of the modifying agent in quantities ranging from 0.5 to 10%.

Examples of suitable modified polymers are as follows (all the percentages being by weight):

I) random copolymers of propylene with 0.5–10% of a $CH_2=CHR$ olefin, wherein R is selected from H and a linear or branched $C_2$–$C_4$ alkyl radical, modified with the said polar groups in quantities from 0.002 to 10%;

II) polyolefin compositions comprising by weight:

a) 30–94%, preferably 54–85%, of polypropylene or polyethylene (HDPE, LDPE or LLDPE) or a propylene/ethylene or propylene/ethylene/$C_4$–$C_{10}$ α-olefin crystalline random copolymer;

b) 0–70%, preferably 5–40%, of an ethylene/propylene or ethylene/1-butene elastomeric copolymer; and c) 0.5–10%, preferably 2–6%, of polypropylene or polyethylene (HDPE, LDPE or LLDPE) modified with the said polar groups in quantities from 0.5 to 10%.

Preferably the adhesive polymer composition also contains from 0.1 to 0.5% by weight of a nucleating agent, such as dibenzylidenesorbitol or talc, and from 0.1 to 10% by weight of titanium dioxide.

Preferably, the above-mentioned α-olefin is selected from 1-butene, 1-pentene, 1-hexene, 4-methyl-1-pentene and 1-octene. Particularly preferred is 1-butene.

Polymer compositions (II) may be prepared blending the components or by sequential polymerisation of the monomers in the presence of stereospecific Ziegler-Natta catalysts supported on magnesium dihalides in active form as described in EP-A-483523, for example.

The method for applying the adhesive polymer composition to the metal surface of the part is not critical. For example, the adhesive polymer composition may be applied by injection moulding or dipping the part into a fluidised bed of polymer powder. Other suitable methods for applying the adhesive polymer in form of powder are by flame spraying or spraying on pre-heated parts or using spray guns equipped with a system for the electrostatic charge of the powders. Alternatively, the extrusion process can be used when the shape of the part is simple. Depending upon the method, the metal surface is heated before or after applying the adhesive polymer composition.

The plastic material that is overmoulded over the metal surface may include thermoplastics such as polyolefins, e.g. homo- or copolymers of ethylene, propylene and 1-butene and polyamides. An example of said polyolefins is a heterophasic polymer composition comprising (percentage by weight):

30–90% of a crystalline propylene homopolymer with an insoluble fraction in xylene at ambient temperature greater than 90, or a crystalline random copolymer of propylene with ethylene and/or a $CH_2$=CHR olefin where R is a $C_2$–$C_6$ alkyl radical, containing more than 85% of propylene and having an insoluble fraction greater than 85%;

0–40% of a polymer fraction containing ethylene, insoluble in xylene at ambient temperature (i.e. about 23° C.); and 10–60% of an amorphous ethylene/propylene copolymer, optionally containing minor amounts of a diene, soluble in xylene at ambient temperature and containing 10–70% of ethylene.

Examples of above heterophasic polymer compositions are described in published European patent applications Nos. 400333 and 472946.

The plastic material can include other components commonly used in the art, such as filler and pigments.

In step (c) heat is applied to the metal surface by induction, for example. A way of applying induction heat is by induction furnace.

The metal surface is heated up to a temperature that causes the softening or melting of the overmoulded plastic material in contact with the metal. Consequently, the temperature depends on the type of used plastic material. For example, when the plastic material is a propylene polymer, the metal surface can be heated at a temperature of 180–220° C.

In order to define how much energy is necessary to heat the coated metal surface at the desired temperature, a way could be to determine it on a metal surface that is not coated.

The process of the present invention optionally comprises the step of applying an organic or inorganic primer to the metal surface before the step of applying an adhesive polymer composition to the metal surface. Examples of suitable primers are epoxy resins and chromates.

When heat is applied during step (c), a pressure is optionally applied to the part and/or to the overmoulded plastic material to increase the adhesion between the metal surface and the plastic material. The pressure is applied by rolling or using moulds, for instance. The type of part and of used polymers affect the values of pressure to be applied. The applied pressure can be selected in the range from 0.01.to 5 MPa. When the pressure is applied by using a mould, the pressure is preferably maintained for 5 seconds or less.

The following examples are given to illustrate but not limit the present invention.

The data relating to the compositions and samples of the examples are determined by way of the methods indicated below:

Melt Index (MIL): ASTM D 1238, condition L

Solubility in xylene: (see note below)

Intrinsic viscosity: determined in tetrahydronaphthalene at 135° C.

Peeling test: NF A 49 711 at room temperature.

Note

Determination of percentage soluble in xylene: one prepares a solution of the sample at a concentration of 1% by weight, maintaining the temperature at 135° C., and stirring the solution for one hour and then cooling the solution to room temperature. The solution is then filtered and acetone is added to a portion of the filtrate in order to obtain the precipitation of the polymer dissolved. The polymer is then recovered, washed, dried, and weighed in order to determine the percentage soluble in xylene.

Polymers used in the Examples

Adhesive polymer composition comprising (percentage by weight):

a) 74% of a crystalline poly(propylene-co-butene-1-co-ethylene), containing about 8% and 2% of recurring units derived from butene-1 and ethylene respectively, containing a minor fraction soluble in xylene at room temperature;

b) 20% of a random copolymer of propylene with 15% of recurring units derived from ethylene, having a soluble fraction in xylene at 23° C. of 50%;

c) 5% of a polypropylene wed with 1.5% maleic anhydride; and d) 1% of $TiO_2$.

The polymers are obtained by polymerizing the olefin monomers in the presence of a high yield Ziegler-Natta catalyst.

The polymer composition is stabilised against thermal and UV ageing using known additives and visbroken with peroxides up to an MIL of 140 dg/min. Its average particle size is 250 $\mu$m obtained by way of cryogenic grinding.

Heterophasic polymer composition having an MIL of 3.5 dg/min and consisting of the following polymers (percentage by weight):

79% of a crystalline propylene homopolymer containing 2.5% of a fraction soluble in xylene at 23° C.; and 21% of a random elastomeric copolymer consisting of 87% of recurring units derived from propylene and 13% from ethylene The fraction soluble in xylene at 23° C. of the said heterophasic composition has an intrinsic viscosity value of 3 dl/g.

The said composition is obtained by way of sequential polymerisation by using a high yield and highly stereospecific Ziegler-Natta catalyst, supported on magnesium chloride.

Comparative Example 1c

A sandblasted plate of carbon steel having dimensions of 124×124×1.5 mm is coupled with a plastic material according to the following process.

Step (a): The plate is heated in a oven at 250° C. and then dipped into a fluidised bed (5 seconds) containing a powder of the adhesive polymer composition. The plate thus coated is allowed to cool in the open air. The coating is 300–400 $\mu$m thick. The adhesion of the plastic coating to the metal is classified 5B according to the ASTM D 3359 method.

Step (b): The plate thus coated is introduced into an injection moulding apparatus. The hollow of the mould has dimensions 126 mm×126 mm and 4 mm thick A layer of the said heterophasic polymer composition is overmoulded over the plate coated with the modified polymer by injecting the heterophasic composition in the mould at a temperature of 260° C. The thus obtained layer is 2–2.2 mm thick.

The peel strength of the plastic material to the carbon steel sheet is 0–2 N/mm.

EXAMPLE 1

The plate coming from step (b) of Comparative Example 1c is subjected to the following step.

Step (c): The plate coupled with the plastic material is heated to a temperature of 180–220° C. by use of an induction furnace and subjected to a rolling at the same time. The applied pressure is about 0.1 MPa.

The peel strength of the plastic material to the carbon steel plate at room temperature is 6.5–7 N/mm.

What is claimed is:

1. A process for affecting a coupling between a plastic material and a metal surface comprising the steps of:
   a) applying a powder of an adhesive polymer composition to the metal surface;
   b) overmoulding the metal surface with a plastic material by injection moulding; and following step b)
   c) cooling the plastic material to a temperature below its softening point; and following step c)
   d) applying heat to the metal surface, to re-soften or re-melt the plastic material in contact with the metal surface to enhance adhesion between the plastic material and the metal surface.

2. The process of claim 1 further comprising a step of heating the metal surface before or after applying the adhesive polymer composition, and before overmoulding the metal surface.

3. The process of claim 1 further comprising the step of applying an organic or inorganic primer to the metal surface before applying the powder of the adhesive polymer composition to the metal surface.

4. A process for affecting a coupling between a plastic material and a metal surface comprising the steps of:
   a) applying a powder of an adhesive polymer composition to the metal surface;
   b) overmoulding the metal surface with a plastic material by injection moulding; and following step b)
   c) cooling the plastic material to a temperature below its softening point; and following step c)
   d) applying heat and pressure to the metal surface to re-soften or re-melt the plastic material in contact with the metal surface to enhance adhesion between the plastic material and the metal surface.

5. The process of claim 2 further comprising the step of applying an organic or inorganic primer to the metal surface before applying the powder of the adhesive polymer composition to the metal surface.

6. The process of claim 4 further comprising a step of heating the metal surface before or after applying the adhesive polymer composition, and before overmoulding the metal surface.

7. The process of claim 4 further comprising the step of applying an organic or inorganic primer to the metal surface before applying the powder of the adhesive polymer composition to the metal surface.

8. The process of claim 6 further comprising a step of applying an organic or inorganic primer to the metal surface before applying the powder of the adhesive polymer composition to the metal surface.

* * * * *